United States Patent
Yousef et al.

(10) Patent No.: US 6,800,315 B2
(45) Date of Patent: Oct. 5, 2004

(54) METHODS FOR DECONTAMINATING SHELL EGGS

(75) Inventors: Ahmed E. Yousef, Columbus, OH (US); Luis A. Rodriguez-Romo, Columbus, OH (US)

(73) Assignee: The Ohio State University Research Foundation, Columbus, OH (US)

( * ) Notice: Subject to any disclaimer, the term of this patent is extended or adjusted under 35 U.S.C. 154(b) by 193 days.

(21) Appl. No.: 09/954,923

(22) Filed: Sep. 18, 2001

(65) Prior Publication Data

US 2003/0059505 A1 Mar. 27, 2003

(51) Int. Cl.⁷ .............................. A23L 1/32; A23B 5/00; A23B 5/10
(52) U.S. Cl. ....................... 426/248; 426/614; 426/312; 426/298
(58) Field of Search ................................. 426/614, 312, 426/298, 248

(56) References Cited

U.S. PATENT DOCUMENTS

| | | | |
|---|---|---|---|
| 5,431,939 A | * 7/1995 | Cox et al. | .................. 426/300 |
| 5,700,426 A | * 12/1997 | Schmitthaeusler et al. | .... 422/29 |
| 5,932,265 A | 8/1999 | Morgan | |
| 5,964,182 A | 10/1999 | Cox et al. | |
| 6,391,259 B1 | * 5/2002 | Malkin et al. | ................. 422/28 |
| 6,433,293 B1 | * 8/2002 | Bollinger et al. | ........... 209/511 |

FOREIGN PATENT DOCUMENTS

| | | | |
|---|---|---|---|
| HU | 206981 | * | 3/1990 |
| JP | 984482 | * | 3/1997 |
| JP | 11178515 | * | 7/1999 |

OTHER PUBLICATIONS

International Search Report dated Dec. 12, 2002.

* cited by examiner

*Primary Examiner*—Anthony Weier
(74) *Attorney, Agent, or Firm*—Calfee, Halter & Griswold LLP; Courtney J. Miller

(57) ABSTRACT

Methods for reducing external and internal contamination of shell eggs by utilizing gaseous ozone applied under mild pressure, alone or in combination with UV-light for external contaminants and gaseous ozone under mild pressure, a mix of carbon dioxide and gaseous ozone, heat, vacuum, or combinations thereof for internal contaminants.

20 Claims, No Drawings

METHODS FOR DECONTAMINATING SHELL EGGS

FIELD OF THE INVENTION

The present invention relates generally to the decontamination of avian shell eggs, and specifically to the reduction of microbial contaminants on both the exterior and interior of avian shell eggs through the application of gaseous ozone, carbon dioxide, pressure, heat, ultraviolet radiation, and combinations thereof.

BACKGROUND OF THE INVENTION

Contamination of shell-eggs by microorganisms such as *Salmonella Enteritidis* constitutes a health hazard to consumers, an added liability to the food industry itself, and an extra burden on governmental agencies involved in regulation and surveillance of the food industry. The fresh egg is one of the most common vehicles for the transmission of Salmonella spp. to humans. Salmonellosis, the food transmitted disease caused by Salmonella spp., results from the consumption of either contaminated shell-eggs or manufactured products containing egg components. According to some estimates, only 1 in 20,000 raw eggs in the United States are contaminated with *Salmonella Enteritidis*; however, the Centers for Disease Control and Prevention (CDC) reported in 1997 a total of 300,000 cases of disease attributable to *Salmonella Enteritidis* (CDC, Morbid. Mortal Weekly Rep. Vol 49 (SS-1):1–72, 2000).

The primary objectives of food sanitation include reducing the levels of microorganisms in food and preventing or limiting further proliferation of microorganisms that contaminate food items. Food sanitation typically involves applying one or more established decontamination procedures to various food items.

Cleaning eggs by washing is a common practice which is required in plants operating under the Federal Grading Service. Egg washers currently used by the food industry spray the eggs with water that contains commercially available sanitizers and detergents. Thermal and chemical treatments have been developed to control or eliminate *Salmonella Enteritidis* in eggs; however, these methods are time consuming, uneconomical and may be only partially effective. Other known decontamination methods include the use of the following: quaternary ammonium compounds, organic acids, high temperature and high pH, gamma irradiation, short-wave ultraviolet light, and ozone.

Irradiation of certain food products with short-wave ultraviolet (UV) light has been demonstrated to be effective for inhibiting the growth of microorganisms on food surfaces, destroying airborne microorganisms and sterilizing liquids. The literature also indicates that UV-light effectively reduces the contamination of shell-eggs by aerobic bacteria, yeasts and molds, and *Salmonella Typhimurium*. Additionally, heat treatment of shell eggs has been utilized to sanitize the surface and to eliminate internal *Salmonella Enteritidis* in eggs.

Despite the methodologies discussed above, there currently are no low-temperature treatments capable of effectively sanitizing eggs. Low temperatures are known to preserve the quality and safety of shell-eggs during production, storage, transportation and retail. Maintaining the shell eggs at low temperatures may significantly reduce the incidence of *Salmonella Enteritidis* egg-related illnesses. Thus, there is a need for low-temperature treatments for effectively sanitizing eggs.

SUMMARY OF THE INVENTION

These and other disadvantages of the prior art are overcome by the present invention which provides a method for reducing external contamination of shell eggs and a method for reducing internal contamination of shell eggs. Both methods utilize gaseous ozone. Reduction of induced external *Salmonella Enteritidis* contamination at low temperatures is achieved using gaseous ozone applied under mild pressure, alone or in combination with UV radiation. In one embodiment, reduction of internal *Salmonella Enteritidis* contamination of shell eggs is achieved using a combination of heat, vacuum, and gaseous ozone under mild pressure. In another embodiment, reduction of internal *Salmonella Enteritidis* contamination of shell eggs is achieved using a combination of heat, vacuum, and a mix of carbon dioxide and gaseous ozone.

A preferred method for treating the exterior of a contaminated, unfertilized shell egg includes the steps of placing a contaminated shell egg (which is at or below ambient or room temperature) in a sealed vessel, wherein the internal pressure of the sealed vessel is equal to atmospheric pressure, increasing the pressure inside the vessel to greater than atmospheric pressure by introducing gaseous ozone into the sealed vessel, and maintaining the shell egg in the sealed vessel for a brief period of time.

An alternate method for treating the exterior of a contaminated, unfertilized shell egg includes the steps of exposing the shell egg to ultraviolet light, transferring the contaminated shell egg in a sealed vessel, wherein the internal pressure of the sealed vessel is equal to atmospheric pressure, increasing the pressure inside the vessel to greater than atmospheric pressure by introducing gaseous ozone into the sealed vessel, and maintaining the shell egg in the sealed vessel for a brief period of time.

A preferred method for treating the interior of a contaminated, unfertilized shell egg includes the steps of placing the shell egg (which is at or below ambient temperature) in a sealed vessel, wherein the internal pressure of the sealed vessel is equal to atmospheric pressure, decreasing the pressure inside the vessel to less than atmospheric pressure, introducing gaseous carbon dioxide into the sealed vessel, introducing gaseous ozone into the sealed vessel, and maintaining the shell egg in the sealed vessel for a brief period of time.

An alternate method for treating the interior of a contaminated, unfertilized shell egg includes the steps of heating the shell egg, transferring the heated shell egg to a sealed container, wherein the internal pressure of the sealed container is equal to atmospheric pressure, decreasing the internal pressure of the sealed vessel to below atmospheric pressure, introducing gaseous ozone into the sealed vessel, and maintaining the shell egg in the sealed vessel for a brief period of time.

Another alternate method for treating the interior of a contaminated, unfertilized shell egg includes the steps of heating the shell egg, transferring the heated shell egg to a sealed container, wherein the internal pressure of the sealed container is equal to atmospheric pressure, decreasing the internal pressure of the sealed vessel to below atmospheric pressure, introducing gaseous carbon dioxide into the sealed vessel, introducing gaseous ozone into the sealed vessel, and maintaining the shell egg in the sealed vessel for a brief period of time.

Further advantages of the present invention will become apparent to those of ordinary skill in the art upon reading and understanding the following detailed description of the preferred embodiments.

DETAILED DESCRIPTION OF THE INVENTION

The present invention provides methods which utilize ozone to reduce bacterial contamination of unfertilized shell eggs by about 1 to 5 $\log_{10}$, in a short time (e.g., 1 to 20 minutes) and at low temperatures (e.g., 0 to 25° C.). Shell eggs include any of a variety of avian eggs covered by an intact hard exterior shell and having a substantially liquid core or center. Unfertilized eggs are eggs that have not been fertilized by sperm or that are not pre-fertilized or "vital" eggs.

Ozone ($O_3$) is a strong and highly reactive antimicrobial agent. Ozone has been extensively studied for potential applications in the food industry for ensuring the safety of food products such as meat, poultry, fish, fruits and vegetables, cheese, and many others. According to the literature, ozone has been tested in decontaminating hatcheries, hatching eggs, poultry chill water, and poultry carcass. Additionally, the United States Food and Drug Administration (FDA) recently approved the broad use of ozone on food. Advantageously, ozone spontaneously decomposes into non-toxic oxygen ($O_2$).

The scientific literature indicates that both gaseous and aqueous ozone are capable of inactivating many poultry pathogens that contaminate the surface of shell-eggs, setters, and hatchers. According to some studies, the absolute penetrability of eggshell of chicken eggs for ozone is 0.0746 $mg/cm^2/min$. A synergistic effect in the use of gaseous ozone and carbon dioxide has been reported for the sterilization of food products.

A. Treatment of External Contamination

A first broad embodiment of the present invention provides a method for reducing external contamination of shell eggs by utilizing different forms of ozone in combination treatments. Reduction of external *Salmonella Enteritidis* contamination at low temperatures is achieved using gaseous ozone applied under mild pressure, alone or in combination with UV radiation. In the embodiments described below, the shell eggs are at or below ambient or room temperature prior to treatment and the ozone used to treat the shell eggs is applied in concentrations greater than the concentration of ozone present in ambient air.

According to the present invention, a preferred method for treating the exterior of a contaminated, unfertilized shell egg includes the steps of placing a contaminated shell egg (which is at or below ambient temperature) in a sealed vessel, wherein the internal pressure of the sealed vessel is equal to atmospheric pressure, and increasing the pressure inside the vessel to greater than atmospheric pressure by introducing gaseous ozone into the sealed vessel. The introduction of gaseous ozone increases the internal pressure of the sealed vessel to about 1 to 40 psi above atmospheric pressure. The total concentration of the gaseous ozone in the sealed vessel is about 20 to 40% V/V. Following the introduction of gaseous ozone, the internal temperature of the sealed vessel is maintained at a temperature of about 1 to 50° C. and the shell egg is treated in the vessel for at least one minute, preferably for about 10 to 20 minutes, and may be treated for up to about 90 minutes. Utilization of this method results in at least a 5 $\log_{10}$ cfu/g reduction of bacterial contamination on the surface of the shell egg.

In an alternate method of the present invention, ultraviolet radiation and gaseous ozone are both utilized. This method for treating the exterior of a contaminated, unfertilized shell egg includes the steps of exposing the shell egg to ultraviolet light, transferring the contaminated shell egg in a sealed vessel, wherein the internal pressure of the sealed vessel is equal to atmospheric pressure, and increasing the pressure inside the vessel to greater than atmospheric pressure by introducing gaseous ozone into the sealed vessel. Preferably, the wavelength of the ultraviolet light is 254 nm and the intensity of the ultraviolet light is about 1500 to 2500 $\mu W/cm^2$. The introduction of gaseous ozone raises the internal pressure of the sealed vessel to about 5 to 15 psi above atmospheric pressure. The concentration of the gaseous ozone in the sealed vessel is about 20 to 40% V/V. Following the introduction of gaseous ozone, the internal temperature of the sealed vessel is maintained at a temperature of about 1 to 50° C. and the contaminated, unfertilized shell egg is treated in the vessel for at least one minute, and preferably, about 2 to 3 minutes. Utilization of this method results in at least a 1 to 4.5 $\log_{10}$ cfu/g reduction of bacterial contamination on the surface of the shell egg.

B. Treatment of Internal Contamination

In a second broad embodiment of the present invention, reduction of internal *Salmonella Enteritidis* contamination of shell eggs is achieved using gaseous ozone under mild pressure, a mix of carbon dioxide and gaseous ozone, heat, vacuum, or combinations thereof. In the embodiments discussed below, the ozone used to treat the shell eggs is applied in concentrations greater than the concentration of ozone present in ambient air.

According to the present invention, a preferred method for treating the interior of a contaminated, unfertilized shell egg includes the steps of placing the shell egg (which is at or below ambient or room temperature) in a sealed vessel, wherein the internal pressure of the sealed vessel is equal to atmospheric pressure, decreasing the pressure inside the vessel to less than atmospheric pressure, introducing gaseous carbon dioxide into the sealed vessel, and introducing gaseous ozone into the sealed vessel. The overall internal pressure of the sealed vessel is decreased to about 5 to 15 psi below atmospheric pressure. The gaseous carbon dioxide is first introduced into the sealed vessel until a pressure of about 5 psi above atmospheric pressure is achieved, and the gaseous ozone is subsequently injected into the sealed vessel until a pressure of about 15 psi above atmospheric pressure is achieved. The concentration of the gaseous ozone in the sealed vessel is about 20 to 40% V/V. The shell egg remains in the sealed vessel for a period of at least one minute, and may be treated for up to about 10 minutes following the introduction of the gaseous ozone into the sealed vessel.

In an alternate embodiment of the present invention, a method for treating the interior of a contaminated, unfertilized shell egg includes the steps of heating the shell egg, transferring the heated shell egg to a sealed container, wherein the internal pressure of the sealed container is equal to atmospheric pressure, decreasing the internal pressure of the sealed vessel to below atmospheric pressure, and introducing gaseous ozone into the sealed vessel. Preferably, the egg is heated to a temperature of about 57 to 60° C. for a period of about 15 to 30 minutes. Prior to the introduction of the gaseous ozone, the internal pressure of the sealed container is decreased to about 5 to 7 psi below atmospheric pressure. The gaseous ozone is then introduced into the sealed container until an internal pressure of 15 psi above atmospheric pressure is obtained. The shell egg is treated with gaseous ozone for at least one minute, and preferably for period of about 10 minutes. Utilization of this method results in at least a 1 to 4.5 $\log_{10}$ cfu/g reduction of bacterial contamination in the interior of the shell egg.

In another embodiment of the present invention, a method for treating the interior of a contaminated, unfertilized shell egg includes the steps of heating the shell egg, transferring the heated shell egg to a sealed container, wherein the internal pressure of the sealed container is equal to atmospheric pressure, decreasing the internal pressure of the sealed vessel to below atmospheric pressure, introducing gaseous carbon dioxide into the sealed vessel; and introducing gaseous ozone into the sealed vessel. Preferably, the shell egg is heated to a temperature of about 58° C. for a period of about 20 minutes. Prior to the introduction of the gaseous carbon dioxide and the gaseous ozone, the internal pressure of the sealed container is decreased to about 5 to 7 psi below atmospheric pressure. The gaseous carbon dioxide is first introduced into the sealed vessel until a pressure of about 5 psi above atmospheric pressure is achieved. The gaseous ozone is subsequently injected into the sealed vessel until a pressure of about 15 psi above atmospheric pressure is achieved. The shell egg is treated with the gaseous carbon dioxide and the gaseous ozone for at least one minute, and preferably for a period of about 10 to 30 minutes. Utilization of this method results in at least a 1 to 4.5 $\log_{10}$ cfu/g reduction of bacterial contamination in the interior of the shell egg.

The examples to follow are illustrative of the precepts of the present invention, but should not be construed in a limiting sense.

EXAMPLE 1

Treatment of Externally Contaminated Eggs

To demonstrate the effectiveness of the present invention in reducing external contamination, shell eggs were externally contaminated with *Salmonella Enteritidis* to contain ~$10^6$ cfu/g shell. The eggs were then treated with gaseous or liquid ozone for 1 to 20 minutes, at 4 to 25° C., and 0 to 15 psi. A combination method included exposure to UV-light for 1 minute, followed by exposure to gaseous ozone (20 to 40% V/V) under pressure (5–15 psi) for 1 to 3 minutes. For purposes of comparison, contaminated eggs where exposed to ultraviolet (UV) light (100–2500 $\mu$W/cm$^2$) for 1 to 5 minutes. Eggs that were (i) non-contaminated and non-treated, (ii) contaminated and non-treated, and (iii) contaminated and treated with air were used as controls.

Cultures and Growth Conditions

A culture of *Salmonella Enteritidis* was maintained in Brain Heart Infusion (BHI) broth. Aliquots of the stock cultures were transferred to 150 ml MacConkey broth (0.1% inoculum) and incubated at 37° C. for 24 hours in an orbital shaker (G-24, New Brunswick Scientific) with agitation. Incubation was continued until the optical density at 600 nm of the cultures was 0.15 to 0.19. *Salmonella Enteritidis* cells were separated in a refrigerated centrifuge (Sorval RC-5B, Dupont Instruments) at 3020 g for 10 minutes. The pellet was resuspended in a sterile phosphate buffer (0.1 M. pH 7) to a final OD$_{600}$ of 0.30 ($10^{7-8}$ CFU/ml).

Ozone Generation and Measurement

Gaseous ozone (12–14% in output mixture, 1.45 liters/min total gas mixture output) was produced by an electrochemical ozone generator (Lynntech, Inc., College Station, Tex.). Ozone gas was released in the treatment chamber until the desired pressure was achieved. Dissolved ozone concentration was measured by spectrophotometric and indigo method.

Egg Preparation

Unfertilized, unwashed, fresh eggs were kept refrigerated until used. Individual eggs were washed and scrubbed using tap water and a brush, and then submerged in ethanol (70% V/V) for 30 minutes to eliminate external contaminants. Sanitized eggs were held at 22–25° C. for about 30 minutes to dry and then dipped into a *Salmonella Enteritidis* cell suspension which was prepared as indicated above. The contaminated eggs were held at 22–25° C. to dry for about 30 minutes. Non-contaminated eggs are treated similarly and used as negative controls.

Egg Treatment with Gaseous Ozone

Eggs, externally contaminated with *Salmonella Enteritidis* (at about $10^6$ CFU/g), were placed in a cold gasket-sealed stainless-steel pressure vessel (4000 ml, 21.6 cm diam.; Alloy Products Corp., Waukesha, Wis.) and treated with gaseous ozone (20–40% V/V/20,000–40,000 ppm/Vol) without pressure, or at a pressure of 15 psi. Compressed air under pressure was used as a control. The treatment temperature was within the range of 1 to 50° C., the treatment time was within the range of 1 to 90 minutes, and the pressure was within the range of 1 to 40 psi.

Egg Treatment with Short-wave Ultraviolet (UV) Light

Externally contaminated shell-eggs ($10^{5-6}$ CFU/g), were placed under a shortwave ultraviolet light source (254 nm; 15 Watt, G15T8 General Electric germicidal lamp, Cleveland, Ohio) on a horizontal apparatus which allowed the adjustment of the light intensity (100–2500 $\mu$W/cm$^2$) by increasing or decreasing the distance between the source and the target. UV-light intensity was detected with a UV radiometer probe (254 nm; Model UVX-25; Ultraviolet Products, Inc. San Gabriel, Calif.), and measured in a digital radiometer (UVX-Digital Radiometer; Ultraviolet Products, Inc.). Eggs constantly rotated during the light exposure were treated at the desired UV-light intensity, and immediately analyzed for the enumeration of *Salmonella Enteritidis*. Contaminated eggs not exposed to UV-light were used as controls. The UV intensity was within the range of 254 nm wavelength/50 $\mu$W/cm$^2$ to 45W/cm$^2$, the 222 nm wavelength-excimer was within the range of 300 to 500 W, the treatment time was within the range of 5 seconds to 15 minutes, and the treatment temperature was within the range of 1 to 50° C.

Combination Treatments of Eggs

*Salmonella Enteritidis* externally contaminated eggs ($10^6$ CFU/g) were treated for short periods of time under refrigerated conditions with UV-light in combination with gaseous ozone under pressure. One combination treatment consisted of short-wave UV-light (254 nm; 1500–2500 $\mu$W/cm$^2$ intensity) for 1 minute, followed by immediate application of gaseous ozone at 20–40% V/V) under pressure (5–15 psi) for 1 minute. The total treatment time of the treatment was 2 to 3 minutes.

The UV intensity was within the range of 254 nm wavelength/50 $\mu$W/cm$^2$ to 45W/cm$^2$, the 222 nm wavelength-excimer was within the range of 300 to 500 W, the treatment time was within the range of 5 seconds to 30 minutes, the treatment temperature was within the range of 1 to 50° C., the treatment time was within the range of 1 to 90 minutes, and the pressure was within the range of 1 to 40 psi. The treatment temperature was within the range of 1 to 50° C., and the treatment time was within the range of 1 to 90 minutes.

Enumeration of Salmonella

The average weight of an egg shell may be determined by cracking the eggs and weighing the shells. In this series of experiments, the average weight was 9.0 g. Treated or control eggs were cracked aseptically, egg contents were discarded, and the shell of each egg was collected in a blender jar for homogenization. Peptone water (0.1%, 81 ml) was mixed with the shell in the blender for 1 minute at a medium speed. Aliquots (1 ml) of the serial decimal dilutions were plated on PCA and incubated at 37° C. for 24 hours for plate count. Salmonellae were confirmed by streaking selected colonies onto XLD agar, incubating at 37° C. for 24 hours, and observing the characteristic colonial morphology.

The data in Tables 1 through 5 were obtained from a duplicate series of experimental runs. Statistical calculations were processed in a MINITAB™ 13.3 version statistical software (Minitab, Inc. 2000). One-way analysis of variance (ANOVA) was performed to determine the differences among control and treatments al 95% confidence limits. Individual treatments were analyzed and compared by paired t-tests at a 0.05 confidence level.

TABLE 1

Effect of gaseous ozone on externally Salmonella Enteritidis contaminated shell-eggs

| Treatments[1] | Time (Minutes) | log CFU/g egg shell[2] | log reduction |
|---|---|---|---|
| Control | 0 | 6.1 ± 0.00A[3] | 0.0 |
| Gaseous Ozone | 3 | 3.4 ± 0.07B | 2.7 |
|  | 5 | 3.9 ± 0.00B | 2.2 |
|  | 8 | 3.7 ± 0.09B | 2.4 |

[1]Control, contaminated shell-eggs without treatments; Gaseous ozone (20–40% V/V).
[2]Data represented as Mean ± S.D.
[3]Means within columns not followed by the same letter are significantly different (P < 0.05).

TABLE 2

Effect of gaseous ozone under pressure on externally Salmonella Enteritidis contaminated shell-eggs

| Treatments[1] | Time (min) | log CFU/g egg shell[2] | log reduction |
|---|---|---|---|
| Control | 0 | 6.4 ± 0.16A[3] | 0.0 |
| Gaseous Ozone | 10 | 0.9 ± 0.40B | 5.5 |
|  | 20 | 0.9 ± 0.35B | 5.5 |

[1]Control, contaminated shell-eggs without treatments; Gaseous ozone (20–40% V/V).
[2]Data represented as Mean ± S.D.
[3]Means within columns not followed by the same letter are significantly different (P < 0.05).

TABLE 3

Effect of UV radiation on externally Salmonella Enteritidis contaminated shell-eggs

| Treatments[1] | Time (min) | log CFU/g egg shell[2] | log reduction |
|---|---|---|---|
| Control | 0 | 5.7 ± 0.13A[3] | 0.0 |
| UV | 2 | 3.1 ± 0.09B | 2.6 |
|  | 4 | 3.7 ± 0.02B | 2.0 |

[1]Control, contaminated shell-eggs without treatments; UV, ultraviolet light radiation (254 nm; 100 µW/cm[2] intensity).
[2]Data represented as Mean ± S.D.
[3]Means within columns not followed by the same letter are significantly different (P < 0.05).

TABLE 4

Reduction of Salmonella Enteritidis on externally contaminated shell-eggs by UV radiation

| Treatments[1] | Time (min) | log CFU/g egg shell[2] | log reduction |
|---|---|---|---|
| Control | 0 | 6.2 ± 0.17A[3] | 0.0 |
| UV | 1 | 2.7 ± 0.27B | 3.5 |
|  | 3 | 2.9 ± 0.89B | 3.3 |
|  | 5 | 2.3 ± 0.78B | 3.9 |

[1]Control, contaminated shell-eggs without treatments; UV, ultraviolet light radiation (254 nm; 1500–2500 µW/cm[2] intensity).
[2]Data represented as Mean ± S.D.
[3]Means within columns not followed by the same letter are significantly different (P < 0.05).

TABLE 5

Effect of combination treatments with UV radiation and gaseous ozone on externally Salmonella Enteritidis contaminated shell-eggs

| Treatments[1] | Time (min) | log CFU/g egg shell[2] | log reduction |
|---|---|---|---|
| Control | 0 | 6.0 ± 0.12A[3] | 0.0 |
| UV | 1 | 2.5 ± 0.01B | 3.5 |
| Gaseous ozone | 1 | 5.2 ± 0.09C | 0.8 |
| UV/O$_3$ | 2 | 1.7 ± 0.29B | 4.3 |

[1]Control, contaminated shell-eggs without treatments; UV, ultraviolet light radiation (254 nm; 1500–2500 µW/cm[2] intensity); Gaseous ozone (20–40% V/V) under pressure (5–15 psi); UV/O$_3$ combination treatment with UV light for 1 minutes followed by gaseous ozone under pressure for 1 minutes.
[2]Data represented as Mean ± S.D.
[3]Means within columns not followed by the same letter are significantly different (P < 0.05).

Results show that ozone treatment alone or in combination with UV-light decreased significantly (P<0.05) the count of *Salmonella Enteritidis* on shell eggs. For example, treating contaminated eggs with gaseous ozone for 10 minutes at 22 to 25° C. and 15 psi decreased Salmonella population≧5 log$_{10}$ cfu/g. The combination of UV-light followed by gaseous ozone under pressure reduced the contamination by 4.3 log$_{10}$ cfu/g.

EXAMPLE 2

Treatment of Internally Contaminated Eggs

Internally contaminated shell-eggs were prepared by inoculating *Salmonella Enteritidis* in the center or the periphery of the yolk to contain about $10^{6-7}$ cfu/g. Eggs were treated with gaseous ozone under pressure (15 psi) for 10 minutes or by a carbon dioxide-gaseous ozone (CO$_2$—O$_3$) mixture under pressure (15 psi) for 10 to 15 minutes. In a first combination treatment, eggs were heated in a water bath at 60° C. for 15 to 20 minutes and then treated with gaseous ozone under pressure for 10 minutes. A second combination treatment consisted of heating eggs (58° C.) for 15 to 30 minutes followed by the application of a mixture of CO$_2$—O$_3$ under pressure for 10 to 30 minutes. Eggs that were (i) non-contaminated and non-treated, and (ii) contaminated and non-treated were used as controls. A more detailed description of the materials and methods for this set of experiments appears below.

Cultures and Growth Conditions

*Salmonella Enteritidis* egg isolate 99-30581-13, provided by the Ohio department of Agriculture was used in the experiments. The bacterium was maintained in Brain Heart Infusion (BHI) broth. Aliquots of the stock cultures were transferred to 150 ml MacConkey broth (0.1% inoculum) and incubated at 37° C. for 24 hours in an orbital shaker (G-24, New Brunswick Scientific) with agitation. *Salmonella Enteritidis* cells were separated in a refrigerated centrifuge (Sorval RC-5B, Dupont Instruments) at 3020 g for 10 minutes. The pellet was resuspended in 3 ml of sterile phosphate buffer (0.1 M, pH 7) to a final cell concentration of about $10^{9-10}$ CFU/ml.

Ozone Generation

Gaseous ozone (12–14% in output mixture, 1.45 liters/min total gas mixture output) was produced by an electrochemical ozone generator (Lynntech, Inc., College Station, Tex.). Ozone gas was released in the treatment chamber until the desired pressure was achieved.

Egg Preparation

Unfertilized, unwashed, fresh eggs were obtained from the Poultry Farm of The Ohio State University and refrigerated until used. Individual eggs were washed and scrubbed using tap water and a brush, and then submerged in ethanol (70% V/V) for 30 minutes to eliminate external contaminants. Sanitized eggs were kept at 22 to 25° C. for about 30 minutes to dry. Aliquots of 50 μl of *Salmonella Enteritidis* cell suspension ($10^{9-10}$ CFU/ml), were inoculated in the center of the yolk of individual eggs. The inoculum was placed inside the egg yolk through a drilled hole previously made on the site opposite to the air sac on the shell using a sterile needle (BD-22, 3.81 cm) coupled to a 1 ml tuberculin syringe. The inoculation site was sealed with a droplet of Duro™ Super Glue®. Alternatively for one experiment, *Salmonella Enteritidis* inoculum was placed in the periphery of the yolk by inoculating in the equatorial region of individual eggs with a sterile needle (BD-22, 1.27 cm). The equatorial inoculation site was sealed as previously described. Non-contaminated eggs were sanitized and used as negative controls.

Gaseous Ozone ($O_3$) and Carbon Dioxide-gaseous Ozone ($CO_2$—$O_3$) Mixture

Eggs contaminated with *Salmonella Enteritidis* (about $10^6$ CFU/g), were placed in a gasket-sealed stainless-steel pressure vessel (4000 ml, 21.6 cm diam.; Alloy Products Corp., Waukhesa, Wis.). The treatment vessel was connected to a vacuum pump to generate a negative pressure of 5 to 15 psi, and then was filled with gaseous ozone alone (20 to 40% V/V) to reach a positive pressure of 15 psi for 10 minutes. For the treatment with the mixture of carbon dioxide and gaseous ozone, vacuum was generated in the treatment chamber as previously described. The gas mixture was formed by compressed carbon dioxide injected into the vessel to reach a positive pressure of 5 psi, and subsequently by filling the chamber with gaseous ozone to achieve a positive pressure of 15 psi that was maintained during the time treatment of 10–15 minutes.

Treatment by Combination of Heat and $O_3$/$CO_2$—$O_3$

*Salmonella Enteritidis* contaminated eggs (about $10^6$ CFU/g) were heat-treated at 58 to 60° C. by immersion in a water bath (Precision® circulating bath 260, Precision Scientific Inc. IL.) for 15 to 20 minutes. The first combination treatment of the shell-eggs consisted of the use of heat (60° C.) as previously described, followed by immediate application of vacuum (5–7 psi) and gaseous ozone alone under pressure (15 psi) for 10 minutes, for a total treatment time of 25 to 30 minutes. In a second combination treatment, contaminated eggs were exposed to heat at 58° C. for 20 minutes, vacuum pressure, and the mixture $CO_2$—$O_3$ prepared as previously described for 10–15 minutes for a total treatment time of 30 to 35 minutes.

Enumeration of Salmonella

Ten eggs were cracked and their contents were weighed to determine the average weight. The average weight of the contents of the eggs used in these experiments was 50 grams. Treated or control eggs were cracked aseptically, shells were discarded, and the contents of each egg were collected in a stomacher bag for homogenization. Peptone water (0.1%, 450 ml) was mixed with the contents in a stomacher (Stomacher lab-blender 400, Cooke Laboratory Products, Va.) for 1 min. Aliquots (0.1 ml) of the serial decimal dilutions were plated onto pre-poured plate count agar (PCA) and homogenized by glass beads. Plates were incubated at 37° C. for 48 hour for plate count. Salmonellae were confirmed by streaking selected colonies onto Xylose-Lysine-Desoxycholate (XLD) agar, and incubating at 37° C. for 24 hours to observe the characteristic colonial morphology.

TABLE 6

Effect of combination treatments with heat and gaseous ozone on Salmonella Enteritidis inoculated in the center of the yolk of shell-eggs.

| Treatments[1] | Time (min) | log CFU/g egg contents[2] | log reduction |
|---|---|---|---|
| Control | 0 | 6.8 ± 0.14A[3] | 0.0 |
| Gaseous ozone | 10 | 6.6 ± 0.10A | 0.2 |
| Heat | 15 | 6.7 ± 0.09A | 0.1 |
| Heat/$O_3$ | 25 | 5.0 ± 0.23B | 1.8 |

[1]Control, internally contaminated shell-eggs without treatments; Gaseous ozone (20–40% V/V at 15 psi); Heat, applied in a water bath at 60° C./15 min; Heat/$O_3$, combination treatment with heat for 15 minutes followed by gaseous ozone under pressure for 10 minutes.
[2]Data represented as Mean ± S.D.
[3]Means within columns not followed by the same letter differ significantly ($P < 0.05$).

TABLE 7

Effect of combination treatments with heat and gaseous ozone on Salmonella Enteritidis inoculated in the center of the yolk of shell-eggs.

| Treatments[1] | Time (min) | log CFU/g egg contents[2] | log reduction |
|---|---|---|---|
| Control | 0 | 6.8 ± 0.14A[3] | 0.0 |
| Gaseous ozone | 10 | 6.7 ± 0.10A | 0.1 |
| Heat | 20 | 4.6 ± 0.63B | 2.2 |
| Heat/$O_3$ | 30 | 3.2 ± 0.41C | 3.6 |

[1]Control, internally contaminated shell-eggs without treatments; Gaseous ozone (20–40% V/V at 15 psi); Heat, applied in a water bath at 60° C./20 min; Heat/$O_3$, combination treatment with heat for 20 minutes followed by gaseous ozone under pressure for 10 min.
[2]Data represented as Mean ± S.D.
[3]Means within columns not followed by the same letter differ significantly ($P < 0.05$).

TABLE 8

Effect of combination treatments with heat and carbon dioxide-gaseous ozone on Salmonella Enteritidis inoculated in the center of the yolk of shell-eggs.

| Treatments[1] | Time (min) | log CFU/g egg contents[2] | log reduction |
|---|---|---|---|
| Control | 0 | 6.5 ± 0.09A[3] | 0.0 |
| $CO_2$/$O_{3g}$ | 10 | 6.7 ± 0.12A | 0.0 |

TABLE 8-continued

Effect of combination treatments with heat and carbon dioxide-gaseous ozone on Salmonella Enteritidis inoculated in the center of the yolk of shell-eggs.

| Treatments[1] | Time (min) | log CFU/g egg contents[2] | log reduction |
|---|---|---|---|
| Heat | 20 | 5.3 ± 0.34B | 1.2 |
| Heat/O$_3$ | 30 | 3.7 ± 0.31C | 2.8 |

[1]Control, internally contaminated shell-eggs without treatments; CO$_2$/O$_3$, mix of carbon dioxide injected under vacuum to reach 5 psi and gaseous ozone (20–40% V/V up to 15 psi); Heat, applied in a water bath at 58° C./20 min; Heat/O$_3$ combination treatment with heat for 20 min followed by application of the mix carbon dioxide-gaseous ozone under pressure for 10 minutes.
[2]Data represented as Mean ± S.D.
[3]Means within columns not followed by the same letter are significantly different (P < 0.05).

TABLE 9

Effect of combination treatments with heat and carbon dioxide-gaseous ozone on Salmonella Enteritidis inoculated in the center of the yolk of shell-eggs.

| Treatments[1] | Time (min) | log CFU/g egg contents[2] | log reduction |
|---|---|---|---|
| Control | 0 | 6.5 ± 0.09A[3] | 0.0 |
| CO$_2$/O$_3$ | 15 | 6.5 ± 0.22A | 0.0 |
| Heat | 20 | 5.3 ± 0.34B | 1.2 |
| Heat/O$_3$ | 35 | 2.8 ± 0.76C | 3.7 |

[1]Control, internally contaminated shell-eggs without treatments; CO$_2$/O$_3$, mix of carbon dioxide injected under vacuum to reach 5 psi and gaseous ozone (20–40% V/V up to 15 psi); Heat, applied in a water bath at 58° C./20 min; Heat/O$_3$ combination treatment with heat for 20 minutes followed by application of the mix carbon dioxide-gaseous ozone under pressure for 15 minutes.
[2]Data represented as Mean ± S.D.
[3]Means within columns not followed by the same letter are significantly different (P < 0.05).

TABLE 10

Effect of combination treatments with heat and carbon dioxide-gaseous ozone on Salmonella Enteritidis inoculated in the periphery of the yolk of shell-eggs.

| Treatments[1] | Time (min) | log CFU/g egg contents[2] | log reduction |
|---|---|---|---|
| Control | 0 | 7.9 ± 0.28A[3] | 0.0 |
| CO$_2$/O$_3$ | 15 | 7.7 ± 0.37A | 0.2 |
| Heat | 20 | 4.5 ± 0.60B | 3.4 |
| Heat/O$_3$ | 35 | 3.7 ± 0.17C | 4.2 |

[1]Control, internally contaminated shell-eggs without treatments; CO$_2$/O$_3$, mix of carbon dioxide injected under vacuum to reach 5 psi and gaseous ozone (20–40% V/V up to 15 psi); Heat, applied in a water bath at 58° C./20 min; Heat/O$_3$ combination treatment with heat for 20 minutes followed by application of the mix carbon dioxide-gaseous ozone under pressure for 15 minutes.
[2]Data represented as Mean ± S.D.
[3]Means within columns not followed by the same letter are significantly different (P < 0.05).

The results indicate that combination treatments with heat (60° C.) and gaseous ozone alone under pressure reduced internal Salmonella Enteritidis contamination by 1.8–3.6 log$_{10}$ with a total treatment time of 25–30 minute. Heat treatment of shell-eggs at 58° C., followed by the application of the mixture CO$_2$—O$_3$ under pressure reduced the contamination by 2.8 to 4.2 log$_{10}$ in a 30 to 35 minute total treatment time.

While the above description contains many specificities, these should not be construed as limitations on the scope of the invention, but rather as exemplification of preferred embodiments. Numerous other variations of the present invention are possible, and it is not intended herein to mention all of the possible equivalent forms or ramifications of this invention. Various changes may be made to the present invention without departing from the scope of the invention.

What is claimed:

1. A method for treating the exterior of a contaminated, unfertilized shell egg, comprising the steps of:
   (a) placing said shell egg in a sealed vessel, wherein the internal pressure of said sealed vessel is equal to atmospheric pressure;
   (b) increasing the pressure inside said vessel to greater than atmospheric pressure by introducing gaseous ozone into said sealed vessel, wherein the total concentration of said gaseous ozone in said sealed vessel is about 20 to 40% V/V; and
   (c) maintaining said shell egg in said sealed vessel following said increase in pressure for a period of at least one minute.

2. The method of claim 1, wherein said shell egg is at or below room or ambient temperature prior to treatment.

3. The method of claim 1, wherein said contamination further comprises contamination by bacteria or other microorganisms, and wherein said contamination is reduced by at least 5 log$_{10}$ cfu/g.

4. The method of claim 1, wherein, following said introduction of gaseous ozone, the internal temperature of said sealed vessel is maintained at a temperature of about 1 to 50° C.

5. The method of claim 1, wherein said introduction of gaseous ozone increases the internal pressure of said sealed vessel to about 1 to 40 psi above atmospheric pressure.

6. The method of claim 1, wherein said shell egg remains in said sealed vessel for a period of about 2 to 90 minutes following the introduction of said gaseous ozone into said sealed vessel.

7. The method of claim 1, wherein said gaseous ozone is generated by electrochemical means external to said sealed vessel, and is applied at a concentration greater than the concentration of ozone present in ambient air.

8. A method for reducing bacterial contamination on the exterior of an unfertilized shell egg by at least 5 log$_{10}$ cfu/g, comprising the steps of:
   (a) placing said contaminated shell egg in a sealed vessel, wherein said sealed vessel has an internal pressure equal to atmospheric pressure and an internal temperature of about 4 to 25° mC.;
   (b) increasing the pressure inside said vessel to about 15 psi above atmospheric pressure by introducing gaseous ozone into said sealed vessel, wherein the final concentration of said gaseous ozone is about 20 to 40% V/V; and
   (c) maintaining said shell egg in said sealed vessel following said increase in pressure for a period of at least ten minutes.

9. A method for treating the exterior of a contaminated, unfertilized shell egg, comprising the steps of:
   (a) exposing said shell egg to ultraviolet light, wherein the intensity of said ultraviolet light is about 1500 to 2500 $\mu$W/cm$^2$;
   (b) placing said contaminated shell egg in a sealed vessel, wherein the internal pressure of said sealed vessel is equal to atmospheric pressure;

(c) increasing the pressure inside said vessel to greater than atmospheric pressure by introducing gaseous ozone into said sealed vessel; and (d) maintaining said shell egg in said sealed vessel following said increase in pressure for a period of at least one minute.

10. The method of claim 9, wherein the wavelength of said ultraviolet light is 254 nm.

11. The method of claim 9, wherein, following said introduction of gaseous ozone, the internal temperature of said sealed vessel is maintained at a temperature of about 1 to 50° C.

12. The method of claim 9, wherein said introduction of gaseous ozone raises the internal pressure of said sealed vessel to about 5 to 15 psi above atmospheric pressure.

13. The method of claim 9, wherein said contaminated, unfertilized shell egg remains in said sealed vessel for a period of about 2 to 3 minutes following the introduction of said gaseous ozone into said sealed vessel.

14. The method of claim 9, wherein said gaseous ozone is generated by electrochemical means external to said sealed vessel, and is applied at a concentration greater than the concentration of ozone present in ambient air.

15. A method for treating the exterior of a contaminated, unfertilized shell egg, comprising the steps of:

(a) exposing said shell egg to ultraviolet light;

(b) placing said contaminated shell egg in a sealed vessel, wherein the internal pressure of said sealed vessel is equal to atmospheric pressure;

(c) increasing the pressure inside said vessel to greater than atmospheric pressure by introducing gaseous ozone into said sealed vessel, wherein the concentration of said gaseous ozone in said sealed vessel is about 20 to 40% V/V; and (d) maintaining said shell egg in said sealed vessel following said increase in pressure for a period of at least one minute.

16. A method for treating the interior of a contaminated, unfertilized shell egg, comprising the steps of:

(a) placing said shell egg in a sealed vessel, wherein the internal pressure of said sealed vessel is equal to atmospheric pressure;

(b) decreasing the pressure inside said vessel to less than atmospheric pressure, (c) introducing gaseous carbon dioxide and gaseous ozone into said sealed vessel, wherein said gaseous carbon dioxide is first introduced into said sealed vessel until a pressure of about 5 psi above atmospheric pressure is achieved, and wherein said gaseous ozone is subsequently injected into said sealed vessel until a pressure of about 15 psi above atmospheric pressure is achieved; and (d) maintaining said shell egg in said sealed vessel following said introduction of gaseous ozone for a period of at least one minute.

17. The method of claim 16, wherein said the internal pressure of said sealed vessel is decreased to about 5 to 15 psi below atmospheric pressure.

18. The method of claim 16, wherein said gaseous ozone is generated by electrochemical means external to said sealed vessel, and is applied at a concentration greater than the concentration of ozone present in ambient air.

19. The method of claim 16, wherein said shell egg remains in said sealed vessel for a period of about 2 to 10 minutes following the introduction of said gaseous ozone into said sealed vessel.

20. A method for treating the interior of a contaminated, unfertilized shell egg, comprising the steps of:

(a) placing said shell egg in a sealed vessel, wherein the internal pressure of said sealed vessel is equal to atmospheric pressure;

(b) decreasing the pressure inside said vessel to less than atmospheric pressure;

(c) introducing gaseous carbon dioxide into said sealed vessel;

(d) introducing gaseous ozone into said sealed vessel, wherein the concentration of said gaseous ozone in said sealed vessel is about 20 to 40% V/V; and (e) maintaining said shell egg in said sealed vessel following said introduction of gaseous ozone for a period of at least one minute.

* * * * *